Nov. 4, 1958     L. LARSSON     2,859,068
VEHICLE ENDLESS BELT TENSIONING MEANS
Filed May 27, 1957
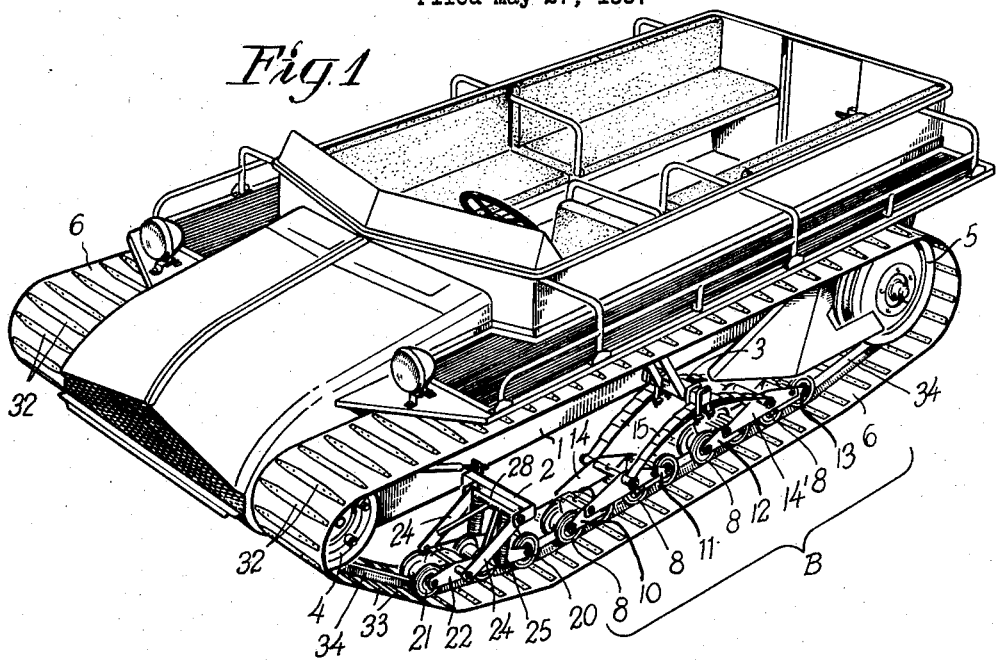
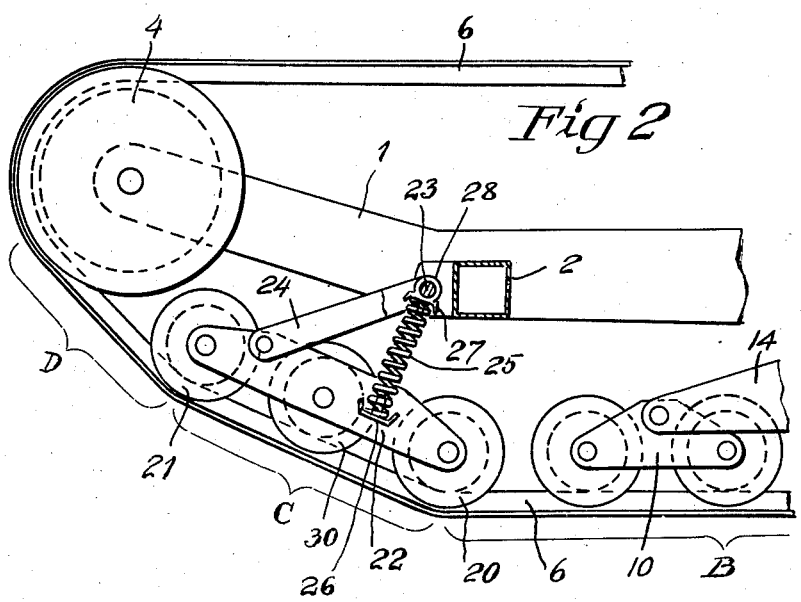
INVENTOR.
Lars Larsson
BY
Pierce, Scheffler & Parker
Attorneys United States Patent Office 2,859,068
Patented Nov. 4, 1958

2,859,068

VEHICLE ENDLESS BELT TENSIONING MEANS

Lars Larsson, Morgongava, Sweden, assignor to Aktiebolaget Westerasmaskiner, Morgongava, Sweden, a corporation of Sweden Application May 27, 1957, Serial No. 661,946

Claims priority, application Sweden June 1, 1956

5 Claims. (Cl. 305—8)

This invention relates to vehicles having endless driving belts or tracks on both sides, which belts run over front and rear guide wheels, the parts of the belt which support the vehicle resting against load carrying wheels, and wherein each belt is inclined downwardly and rearwardly between the front guide wheel and and the supporting part of the belt. The object of the invention is to provide an improved construction which prevents slack in the belts under varying travelling conditions.

This object is attained by mechanism illustrated in the accompanying drawing in which:

Fig. 1 is a perspective view of a vehicle constructed in accordance with the invention, and Fig. 2 is a partially sectional view to an enlarged scale of the front part of the vehicle.

Referring to the drawing, numeral 1 denotes longitudinal beams forming part of the frame of the vehicle. Transverse beams 2 and 3 projecting laterally beyond the beams 1 are welded to the frame structure. On either side of the vehicle there is provided a front guide wheel 4 and a rear guide wheel 5 for an endless belt 6. The front guide wheels 4 are driven by the engine of the vehicle and serve as drive wheels for the belts. The supporting part B of each belt rests against load carrying wheels 8 which are pairwise mounted in bogie frames 10, 11, 12, 13. The bogie frames are in pairs articulated to the ends of bogie carriers 14, 14' which in turn are articulated to the ends of leaf springs 15 which are secured to the beam 3 constituting the central support for the body of the vehicle.

The front guide wheel or drive wheel 4 is mounted in the frame of the vehicle. The rear guide wheel or idler 5 is larger than the drive wheel and may be resiliently or non-resiliently mounted in the frame. In any case, the wheel 5 should normally be loaded less than the load carrying wheels 8.

Each belt 6 is inclined downwardly and rearwardly between the drive wheel 4 and the supporting part B of the belt. At the bend between the inclined part and the supporting part B there is provided a roll 20 mounted in a carrier 22 which at its front end has mounted thereon a second roll 21. On a shaft 23 carried by the beam 2 there is pivotally mounted a linkage 24 consisting of two arms which are pivotally mounted near the front end of the carrier 22. The carrier 22 is acted upon by a spring device which tends to urge the carrier against the belt. In the embodiment illustrated, the spring device consists of two coil springs 25 which are inserted between the frame of the vehicle and the carrier 22. The springs engage the carrier at a place located considerably closer to the roll 20 than to the roll 21, resulting in that the first-named roll exerts a greater pressure on the belt than the last-named roll. The length of the belt 6 and the pressure exerted on the belt by the roll 21 are chosen such that in the normal positions of the belt and the rolls the belt will be bent between the sections C and D of the inclined part.

The lower ends of the springs 25 are guided by a support 26 connected to the carrier 22, while the top ends of the springs are guided by a support 27 connected to a sleeve 28 which is mounted on the shaft 23. Alternatively, the support 27 may be directly connected to the beam 2. In the position shown in the drawing, the springs are precompressed to a considerable extent.

The linkage 24 merely serves to maintain the carriage consisting of the carrier 22 and the rolls 20, 21 in its desired position relative to the drive wheel 4 and the load carrying wheels 8.

As will be apparent from the drawing, roll 21 merely acts to tension the belt 6, whereas roll 20 which is subjected to a greater spring pressure acts as a load carrying wheel as well. When the vehicle moves on uneven ground or on a ground, such as snow, having a varying load-carrying capacity and the roll 20 consequently is moved upwards or downwards relative to the body of the vehicle, the carrier 22 will be swung in a direction such that the roll 21 will be moved in a direction opposite to the movement of the roll 20. The same movements will occur when an obstacle is encountered by the inclined part of the belt 6 at the roll 21 or in front or rearwardly of said roll. In this case, the roll 21 will be moved upwards and the carriage carrier 22 will be swung such that the roll 20 will move downwards and thereby tension the belt so as to compensate for the slack in the belt near the roll 21.

The carrier 22 will always be swung around the place of engagement 26 between the springs 25 and the carrier 22, since the links 24 are pivotally connected both with the frame of the vehicle and the carrier and, consequently, cannot act as fulcrums for the carrier. It will also be apparent that the swinging movement of the carrier around the lower ends of the springs 25 will not involve any substantial variation of the tension of the belt 6.

As shown in the drawing, at least one additional roll 30 may be mounted in the carrier 22 between the rolls 20 and 21.

The belts 6 may consist of an elastic material, such as rubber, and may be provided with external and internal reinforcing ribs 32 and 33, respectively. The belts also have endless longitudinally extending ridges 34 which engage the central parts of the wheels 8 and rolls 20, 21, 30. The wheels and rolls have lateral flanges which guide the wheels and rolls along the lateral faces of the ridges 34. The flanges of the drive wheels 4 are firmly pressed against the side faces of the wedge-shaped ridges 34 to transmit the movements to the belts 6.

What I claim is:

1. A vehicle comprising in combination a vehicle body including a frame, a pair of endless driving belts on opposite sides of the body movable with respect to the body for propelling the vehicle, load carrying wheels on each side of the body for supporting the body with respect to the belts, front and rear guide wheels for the belt, each belt being inclined downwardly and rearwardly between its front guide wheel and the supporting part of the belt, a load carrying roll engaging the belt between the inclined part and the supporting part thereof, a longitudinally extending carrier for said roll, a second roll mounted on the carrier spaced apart from and in front of the first-named roll and engaging the inclined part of the belt, a linkage pivotally connecting the carrier to said frame, and a compression spring acting on the carrier at a place closer to the first roll than to the second roll.

2. A vehicle as set forth in claim 1 wherein the linkage is connected to the carrier at a place in front of said spring.

3. A vehicle as claimed in claim 1 and further comprising at least one additional belt-engaging roll on said carrier intermediate said first-named roll and said second roll.

4. A vehicle as defined in claim 1 wherein said vehicle frame includes at least one transverse beam, and further including a plurality of bogie frames on each side of the vehicle body to which are secured said load carrying wheels, bogie carriers connecting said bogie frames as pairs, and leaf springs connecting said bogie carriers to said vehicle frame, said leaf springs being secured at their ends to separate bogie carriers, the mid-portion of said leaf springs being secured to said transverse beam.

5. A vehicle as defined in claim 4 wherein said transverse beam has a length approximately equal to the width of the vehicle.

References Cited in the file of this patent

UNITED STATES PATENTS

| 1,296,309 | Netzel | Mar. 4, 1919 |
| 2,560,030 | Allen | July 10, 1951 |

FOREIGN PATENTS

| 518,367 | France | May 24, 1921 |
| 650,279 | France | Jan. 7, 1929 |
| 312,833 | Great Britain | June 6, 1929 |
| 497,672 | Germany | Apr. 24, 1930 |